UNITED STATES PATENT OFFICE.

THEODORE A. HOFFMANN, OF BEARDSTOWN, ILLINOIS.

IMPROVEMENT IN THE MANUFACTURE OF DEXTRINE, SUGAR, &c.

Specification forming part of Letters Patent No. 50,347, dated May 25, 1858; Reissue No. 1,995, dated June 13, 1865.

*To all whom it may concern:*

Be it known that I, THEODORE A. HOFFMANN, of Beardstown, in the county of Cass and State of Illinois, have invented a new and useful Improvement in the Manufacture of Dextrine, Sugar, &c., from Corn and other Grain; and I do hereby declare that the following is a full, clear, and exact description thereof, which will enable others skilled in the art to fully understand and make use of the same.

This invention consists in treating Indian corn, grain, or starch made from the same, with diluted acids and water at a temperature of 225° to 350° Fahrenheit, for the purpose of converting the same into dextrine, sugar, alcohol, or vinegar, the tun in which the mash is exposed to the above-named temperature being constructed of sufficient strength to stand the pressure due to said temperature.

The application of acid for converting starch into gum and sugar has been known and understood many years, and also that with the common or usual method of boiling at 212° Fahrenheit the conversion of the starch would be the quicker the greater the quantity of acid used. The application of acid directly on cereals has also been tried, but has hitherto been considered impracticable in a technical or manufacturing view.

My method of converting corn, grain, or starch into dextrine, grape sugar, &c., is different from the above and is carried out in the following manner.

The mash-tun which I use is similar to those used in distilleries, omitting, however, the lining of copper or iron; and it must be so constructed as to bear the extreme pressure caused by raising the boiling mass above 212° from 225° to 350° Fahrenheit. It must be made of wooden staves of proportional strength, at least four inches at top and bottom, four and a half to five inche thick, according to the size and capacity of the tun. The bottom should be from five to six feet, and the top four and one-half to five and one-half feet in diameter by eight or nine feet high in clear. The top is provided with a man-hole for the purpose of introducing the grain or for cleaning out the tun and also with a safety-valve, and either a manometer or a thermometer and collapsing-valve. The steam is connected to the tun through an iron pipe of one or one and one-fourth inch diameter, which is connected to a steam-cock. That part of said pipe inside the tun is made of lead and connected with the iron pipe by a check-valve. It may be made to pass either through the top of the mash-tun or through its side a few inches below the top. The shaft to which the stirrer is attached is carried through the center of the bottom of the tun, and works in an iron sleeve which is fastened to the bottom of the tun by a flange. This sleeve may also be covered with sheet-lead in order to avoid the action of the acid on the iron. Said shaft passes through a stuffing-box in the bottom of the tun, to prevent the escape of steam. If the arrangement of the machinery requires it, the stirrer-shaft may be inserted through the top instead of the bottom of the tun, in which case, of course, the stuffing-box would also be on the top. On the bottom of the tun is a slide or faucet for emptying the same, fitted up similarly to those in use in distilleries, only faced with lead. To every bushel of grain I use from ten to twelve gallons of water, and when heated to the boiling-point I add sulphuric acid from one to three per cent. of the weight of the grain or other starch. The sulphuric acid which I use is of 1.840 specific gravity, or of 65° to 66° Baumé; or, what is more economical and profitable to the manufacturer, the diluted acid known as "chamber acid" may be used in proportionate quantities. I then add to the boiling mixture of water and acid the ground corn or other cereal gradually and in such quantities as will not cause the mash to form a thick paste, the same being kept in motion with the usual stirring apparatus. When the whole grain is added the mash-tun is closed, the heat and pressure raised, as before described, and the mash kept in motion from two to three hours, when the starch in the grain is converted into dextrine. In order to ascertain the precise period to stop boiling, I apply to a small portion—say a tea-spoonful—of the mash a few drops of the solution of iodine in alcohol, and when the iodine no longer produces a bluish color, the process for making dextrine is complete. If the object is to manufacture dextrine starch-gum for technical purposes, the application of steam is withdrawn at this stage of the process and immediately, while the mash is still hot, I saturate the acid either with marble-dust, whiting, or slaked lime mixed with water to a cream-like consistency while the mash is kept in motion by the stirrer.

A sufficiency of the alkaline mixture is known to be added when it is found that blue litmus paper dipped into the mash ceases to turn red. (A surplus of lime or marble-dust will give to the whole a yellowish color and a peculiar smell.) The mash may then stand an hour to settle, and when strained and pressed the clean liquor, which will run off, contains the gum and some gluten in solution, which may be used in that state or concentrated by evaporation.

For the manufacture of sugar or vinegar or alcohol thereof, the process of steaming is continued for about one hour longer, or until the mash has become sweet and the sugar formed. The steaming process is then stopped and the acid saturated, and the whole tested with litmus paper, as previously described. The mash is then cooled with cold water to 70° or 85° Fahrenheit, according to the season, and then fermented by yeast and distilled in the usual way. In making vinegar the saccharine liquid or mash is diluted with water to a gravity of between sixteen or eighteen per cent., then strained and cooled in a flat vessel or cooler to the usual fermenting-point varying between 65° to 85° Fahrenheit, and subjected to a fermentation. When clear the vinous liquid is worked on the vinegar-stand, as usual. The residue obtained by the straining process can be used for feeding, fertilizing, or in the paper-mill when mixed with a certain percentage of rags, or it may be used in the manufacture of shoe-blacking or for other technical purposes.

I do not claim the separate action of steam and acids for converting grain, starch, or other cereals into dextrine, sugar, or alcohol at the usual boiling-point of water or under a pressure of one atmosphere; but

I claim as new and desire to secure by Letters Patent—

1. The combination of steam and acids for converting starch, corn, and other cereals into dextrine, sugar and vinegar, or alcohol thereof, when said grain is subjected to the action of diluted acids and water, and the temperature of the mash is elevated to from 225° to 350° (below 350°) Fahrenheit.

2. The use of a closed mash-tun of such a strength as to be able to sustain the pressure due to the temperature of 225° to 350° Fahrenheit, substantially as herein described, for the purpose of mashing starch, corn, and other cereals.

THEODORE A. HOFFMANN.

Witnesses:
M. M. LIVINGSTON,
J. P. HALL.